United States Patent
Friedmann et al.

[11] Patent Number: 5,814,219
[45] Date of Patent: Sep. 29, 1998

[54] PLEATED FILTER HAVING A PLANAR SHEET OF RANDOMLY ARRANGED FILAMENTS TO MAINTAIN PLEAT SPACING

[75] Inventors: Francis A. Friedmann, South St. Paul; Wayne M. Wagner, Apple Valley; Daniel T. Risch, Burnsville, all of Minn.

[73] Assignee: Donaldson Company, Inc., Minneapolis, Minn.

[21] Appl. No.: 694

[22] Filed: Dec. 30, 1997

Related U.S. Application Data

[63] Continuation of Ser. No. 426,222, Apr. 21, 1995, abandoned.

[51] Int. Cl.⁶ .................................................. B01D 27/06
[52] U.S. Cl. ............................ 210/493.3; 210/493.5; 210/497.01; 210/505; 210/508; 55/497; 55/498; 55/500; 55/519; 55/521
[58] Field of Search ............................... 210/493.1, 493.2, 210/493.3, 493.4, 493.5, 497.01, 503, 504, 505, 508; 55/497, 498, 500, 520, 521, 524, 527, 514, DIG. 44, 519

[56] References Cited

U.S. PATENT DOCUMENTS

| | | |
|---|---|---|
| 2,749,265 | 6/1956 | Fricke et al. . |
| 3,165,472 | 1/1965 | Briggs . |
| 3,241,680 | 3/1966 | Humbert, Jr. . |
| 3,310,177 | 3/1967 | Briggs et al. . |
| 3,334,752 | 8/1967 | Matravers . |
| 3,362,541 | 1/1968 | Briggs et al. . |
| 3,368,687 | 2/1968 | Ruschman . |
| 3,376,979 | 4/1968 | Bair . |
| 3,392,843 | 7/1968 | Mumby . |
| 3,397,793 | 8/1968 | MacDonnell . |

(List continued on next page.)

FOREIGN PATENT DOCUMENTS

| | | |
|---|---|---|
| 12 53 236 | 11/1967 | Germany . |
| 1 401 232 | 7/1975 | United Kingdom . |
| 2 082 932 | 3/1982 | United Kingdom . |

OTHER PUBLICATIONS

Bostik Product Information; Bostik 5800 Series Polyester Web Adhesive; Mar. 1993; 1 page.
Bostik Product Information, Bostik 5600 Series Polyester Web Adhesives; Oct. 1993 1 page.
Bostik Product Information; Bostik 5200 Series Polyamide Web Adhesive; Mar. 1993; 1 page.
Bostik Product Data; Bostik 5000 Web Hot Melt Adhesives; Feb. 1992; 2 pages.

*Primary Examiner*—W. L. Walker
*Attorney, Agent, or Firm*—Merchant, Gould, Smith, Edell, Welter & Schmidt, P.A.

[57] ABSTRACT

The present invention relates to a filter including a filter element having a sucession of inner connected pleats. The pleats have successive pleat tips which define an outer boundary of the filter element. Covering the entire outer boundary of the filter element is a permeable generally inelastic sheet which extends across successive pleat tips. The sheet is adhesively affixed to the pleat tips for maintaining spacing of the pleats. The sheet comprises of plurality of randomly arranged plastic filaments which are bonded to each other junctions between the filaments and define a plurality of randomly spaced and shaped opening for allowing substantially unrestricted flow of a fluid through the sheet.

23 Claims, 5 Drawing Sheets

U.S. PATENT DOCUMENTS

| | | |
|---|---|---|
| 3,716,436 | 2/1973 | Pall et al. . |
| 4,046,697 | 9/1977 | Briggs . |
| 4,211,543 | 7/1980 | Tokar et al. . |
| 4,243,397 | 1/1981 | Tokar et al. . |
| 4,402,830 | 9/1983 | Pall . |
| 4,442,861 | 4/1984 | Dusza . |
| 4,452,619 | 6/1984 | Wright et al. . |
| 4,464,263 | 8/1984 | Brownell . |
| 4,619,674 | 10/1986 | Erdmannsdorfer . |
| 4,629,483 | 12/1986 | Stanton . |
| 4,650,506 | 3/1987 | Barris et al. . |
| 4,652,285 | 3/1987 | Greene . |
| 4,701,197 | 10/1987 | Thornton et al. . |
| 4,704,144 | 11/1987 | Leblanc et al. . |
| 4,767,426 | 8/1988 | Daly et al. . |
| 4,826,597 | 5/1989 | Silverwater et al. . |
| 4,834,885 | 5/1989 | Misgen et al. . |
| 4,838,905 | 6/1989 | Billiet et al. . |
| 4,878,929 | 11/1989 | Tofsland et al. . |
| 5,084,178 | 1/1992 | Miller et al. . |
| 5,154,827 | 10/1992 | Ashelin et al. . |
| 5,252,207 | 10/1993 | Miller et al. . |
| 5,275,743 | 1/1994 | Miller et al. . |
| 5,415,676 | 5/1995 | Tokar et al. . |

PLEATED FILTER HAVING A PLANAR SHEET OF RANDOMLY ARRANGED FILAMENTS TO MAINTAIN PLEAT SPACING

CROSS REFERENCE TO RELATED APPLICATIONS

This application is a Continuation of application Ser. No. 08/426,222, filed Apr. 21, 1995, now abandoned, which application is hereby incorporated by reference.

FIELD OF THE INVENTION

The present invention relates generally to pleated filters. Specifically, the present invention relates to pleated filters having means for maintaining pleat spacing and methods for making the same.

BACKGROUND OF THE INVENTION

The desirability of maintaining equal pleat spacing in a pleated filter is well known in the art. By maintaining equal pleat spacing, the surface area of the filter is maximized which maximizes the capacity and life of the filter and minimizes pressure drop across the filter.

A variety of techniques have been developed for maintaining pleat spacing in a pleated filter. For example, U.S. Pat. Nos. 3,397,793 and 4,046,697 each disclose cylindrical pleated filters employing textile netting wraps affixed to the pleats for maintaining pleat spacing. The textile netting of such prior art filters has a regular pattern of relatively large openings for allowing fluid passage through the netting. Additionally, the netting employed by such prior art filters is elastic. Due to the elasticity of the textile netting, the pleats are not secured rigidly in place because the netting stretches when the filter is in use to allow circumferential flexing and ganging of the pleats under increased operating pressures. Therefore, during the periods of increased pressure, the existing filters undergo periods of decreased capacity and high pressure drop as the pleats are ganged together.

Other prior art filters, such as the pleated filter disclosed in U.S. Pat. No. 5,252,207, employ spiral outer wraps affixed to pleat tips for maintaining pleat spacing. However, these prior art filters require regularly spaced relatively large openings in the outer wraps. The regular openings in the wraps reduce the surface area of the pleat tips which can be bonded to the wraps thereby reducing support provided to the pleats by the wraps. Additionally, the spiral wraps of the prior art filters are difficult to uniformly apply and not practically well suited for automation. Furthermore, the spiral wraps also cause unwanted flow patterns to the filters thereby affecting the capacity of the filters.

Another feature of prior art filters is that they typically employ rigid metal and plastic frames, cores or liners for providing the filters with sufficient rigidity to withstand operating pressures.

What is needed is a pleated filter including an improved means for maintaining pleat spacing. Also what is needed is a pleated filter having pleats which are substantially held rigidly in place. Also what is needed is a filter which is inherently rigid and employs minimal additional frame work for support. What is additionally needed is a filter that is ideally suited for automated manufacturing processes.

SUMMARY OF THE INVENTION

The present invention relates to a filter including a filter element having a succession of interconnected pleats. The pleats have successive pleat tips which define a cylindrical boundary of the filter element. Covering the boundary of the filter element is a permeable generally inelastic sheet which extends across successive pleat tips. The sheet is wrapped about the filter element and preferably shrink-fitted against the pleat tips of the filter element by application of heat to the sheet. The sheet advantageously increases the rigidity of the filter and maintains pleat spacing without substantially interfering with the flow of a fluid through the filter.

The present invention also relates to a filter having a pleated filter element including successive pleat tips which define a planar boundary of the filter element. The filter includes a permeable generally inelastic sheet affixed to the pleat tips for maintaining pleat spacing and covering the planar boundary.

Another aspect of the present invention relates to a method for making a cylindrical filter. The method involves providing a pleated filter element having a succession of interconnected pleats. The pleats of the filter element have successive pleat tips which define a generally planar boundary of the filter element. A permeable sheet is affixed to the pleat tips such that the sheet extends across the successive pleat tips along the planar boundary of the filter element. The permeable sheet provides sufficient structure to the filter element to allow the filter element to be easily rolled up into a cylinder shape such that the pleat tips define a generally cylindrical boundary of the filter element which is covered by the permeable sheet.

An additional aspect of the present invention relates to constructing a filter by placing a permeable plastic sheet around a cylindrical pleated filter element and posttensioning the plastic sheet.

A variety of advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION OF THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
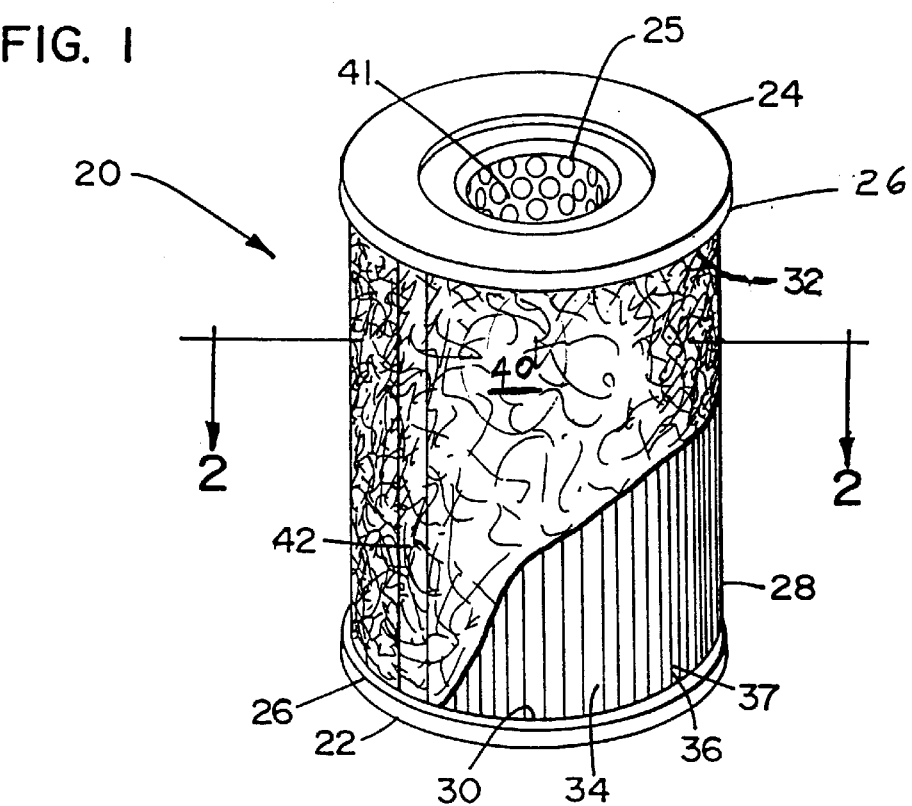
FIG. 1 is a perspective view of a cylindrical pleated filter that is an embodiment of the present invention.
Figure 2:
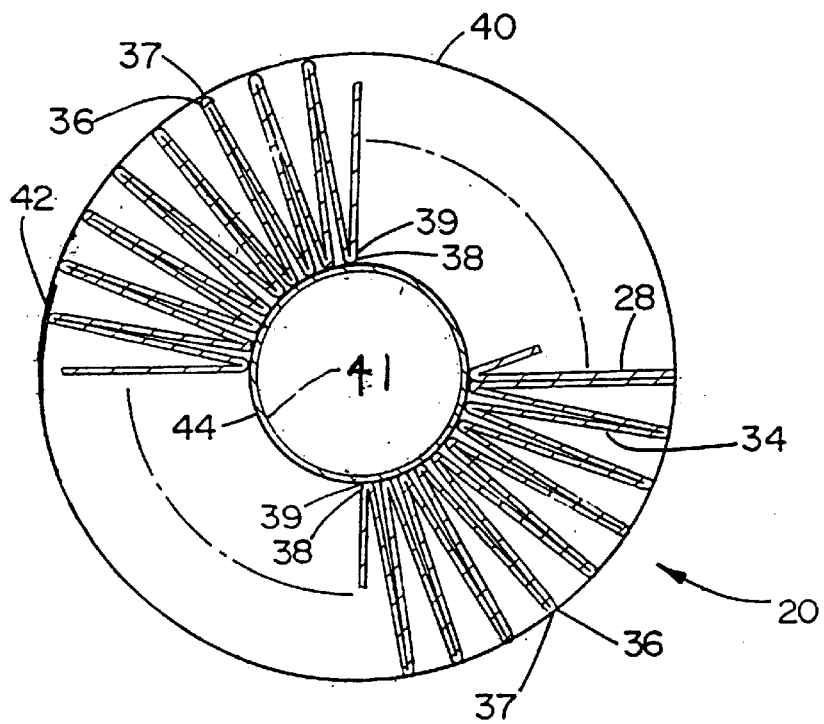
FIG. 2 is a sectional view of the cylindrical pleated filter of FIG. 1 taken along section line 2—2 of FIG. 1.

Referring to FIGS. 1 and 2, there is illustrated a cylindrical filter 20 in accordance with the principles of the present invention. The filter 20 preferably includes a first end cap 22 that opposes and is generally parallel to a second end cap 24. The first and second end caps 22, 24 are preferably circular plates constructed of metal or plastic. The first end cap 22 is solid throughout while the second end cap 24 is annular and defines a circular hole 25 that is concentric with the center of the second end cap 24. The first and second end caps 22, 24 each include a raised lip 26 that extends around the entire circumference of each end cap 22, 24.

The cylindrical filter 20 also includes a filter element 28 which is oriented between the first end cap 22 and the second end cap 24. The filter element 28 has a first end 30 inserted within the raised lip 26 of the first end cap 22 and adhesively affixed to the first end cap 22. Similarly, the filter element 28 has a second end 32 inserted within the raised lip 26 of the second end cap 24 and adhesively affixed to the second end cap 24.

The filter element 28 is preferably composed of corrugated filter paper or a like material which is folded to form a succession of interconnected pleats 34. The pleats 34 have successive outer pleat tips 36 which define a generally cylindrical outermost boundary of the filter element 28. Each of the outer pleat tips 36 has an outermost edge 37 which extends longitudinally between the first end cap 22 and the second end cap 24. Similarly, the pleats 34 also have inner pleat tips 38 which define an innermost boundary of the filter element 28. The innermost boundary of the filter element 28 is generally cylindrical and is in general axial alignment with the circular hole 25 in the second end cap 24. Each of the inner pleat tips 38 also has an innermost edge 39 that extends longitudinally between the first end cap 22 and the second end cap 24.

An additional component of the cylindrical filter 20 is a permeable generally inelastic first sheet 40 comprising a liner which tightly covers the entire outermost boundary of the filter element 28. The first sheet 40 is preferably wrapped once about the filter element 28 such that the first sheet 40 extends across successive outer pleat tips 36 and is preferably adhesively affixed to the outer pleat tips 36. It is desireable for the first sheet 40 to have end portions overlapping at a first seam 42 which extends longitudinally from the first end cap 22 to the second end cap 24. However, it will be appreciated that the end portions of the first sheet 40 may be flush with each other and reinforced by a thin strip of sheet material (not shown) or a layer of adhesive thereby forming an abutted longitudinal seam.

It is preferred for the wrapped first sheet 40 to be post-tensioned by shrink-fitting the first sheet 40 tightly against the outer pleat tips 36 through the application of heat to the first sheet 40. Furthermore, it is also preferred for the first sheet 40 to be adhesively affixed to essentially the entire outermost edge 37 of each of the outer pleat tips 36.

It has been determined by the inventors that because the first sheet 40 has a single longitudinal seam 42 and is post-tensioned tightly against the outer pleat tips 36, the first sheet 40 extends tautly across the successive outer pleat tips 36 without having any substantial slack or wrinkles. Additionally, the tensioned first sheet 40 exerts uniformly distributed centripetal forces against the outer pleat tips 36 which are balanced against a perforated structural inner liner 41 of the filter 20 preferably constructed of metal or plastic.

The balanced centripetal forces increase the rigidity of the filter 20 and assist in maintaining equal spacing of the pleats 34.

It will be appreciated that the first sheet 40 also may serve the purpose of protecting the filter element 28 during assembly and use of the filter 20 thereby eliminating the need for an additional protective covering such as a conventional outer liner constructed of perforated metal or plastic.

The cylindrical filter 20 further includes a permeable generally inelastic second sheet 44 comprising a liner which preferably covers the entire innermost boundary of the filter element 28. The second sheet 44 extends across successive inner pleat tips 38 and is adhesively affixed the inner pleat tips 38 in order to maintain spacing of the pleats 34 and to provide additional rigidity to the filter element 28. For some filtering applications, the second sheet 44 provides sufficient support to the filter element 28 to eliminate the need for the additional structural support provided the structural inner liner 41 of the filter 20.

Figure 3A:
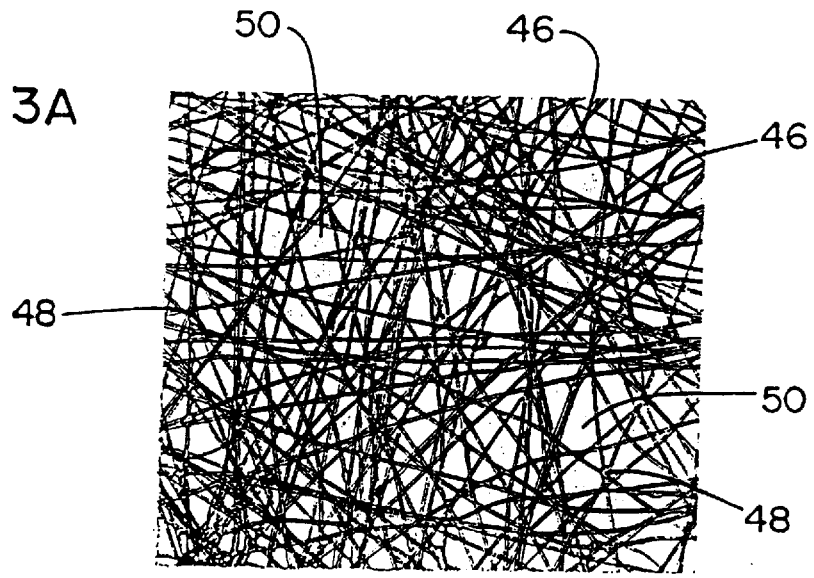
FIGS. 3A–3B illustrate two constructions of sheets used to retain pleat tips of a pleated filter.
Figure 3B:
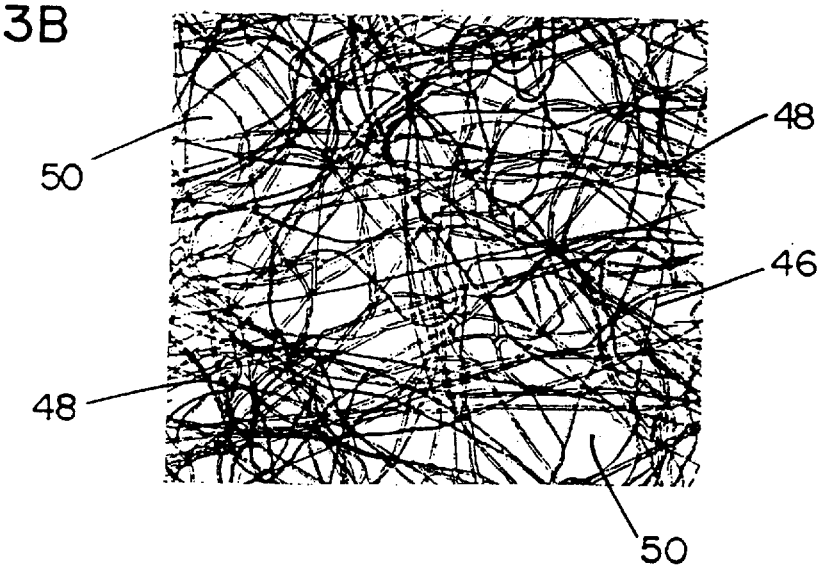

Referring to FIGS. 3A and 3B, the first and second sheets 40, 44 each preferably comprise a plurality of randomly arranged filaments 46 made of a plastic material such as polyester, polyamide or polypropylene. The filaments 46 are bonded to each other at junctions 48 between the filaments 46. It will be appreciated that the filaments may be straight, as shown in FIG. 3A, or crimped as shown in FIG. 3B.

The plurality of randomly arranged filaments 46 define a plurality of randomly spaced and shaped openings 50 within the first and second sheets 40, 44. Due to their random arrangement, the filaments 46 provide equal strength in all directions. Additionally, the filaments 46 are relatively inelastic as compared to the typical forces exerted on the sheets 40, 44 during use of the filter 20. In this regard, it has been determined by the inventors that the relative inelasticity of the filaments 46 minimizes stretching of the sheets 40, 44 thereby allowing the sheets 40, 44 to firmly maintain the spacing of the pleats 34.

It has also been determined by the inventors that important physical characteristics of the first and second sheets 40, 44 relate to their permeability and thickness. In this regard, it is desirable for the first and second sheets 40, 44 to each have a Frazier air permeability greater than 500 and a thickness less than 0.009 inch. It has further been determined that under most filtering conditions, first and second sheets 40, 44 designed within the above established parameters perform substantially no filtering function and experience substantially no contaminant loading. Additionally, pressure drops caused by the first and second sheets 40, 44 are substantially undetectable as compared to the pressure drop caused by the filter element 28 and the contaminants collected thereon.

It will be appreciated that in certain conditions it may be desirable to employ first and second sheets 40, 44 having a Frazier air permeability less than 500 and a thickness greater than 0.009 inch. It will further be appreciated that for certain other conditions, it may be desireable for the first and second sheets 40, 44 to perform a filtering and/or agglomeration function.

It will be further be appreciated that Reemay Corporation manufactures a polyester fabric sold under the trade name Reemay which can effectively be used as the first and second sheet 40, 44. Reemay Corporation also manufactures a polypropylene fabric under the trade name Typar which can also be effectively used as the first and second sheets 40, 44. Furthermore, the Fiberweb North America Inc. manufactures a fabric under the trade name Cerex which is also suitable for use as the first and second sheets 40, 44.

In operation, the cylindrical filter 20 is used to filter contaminates from a fluid. The contaminated fluid preferably passes through the openings 50 in the first sheet 40 without experiencing any measurable pressure drop and without undergoing any substantial filtering effect by the first sheet 40. The contaminated fluid then passes through the filter element 28 thereby having contaminates removed from the fluid. Asymmetry in the spacing of the pleats 34 and uneven contaminant loading of the filter element 28 create paths of lesser resistance through which the fluid has a tendency to flow. The non-uniform flow of fluid through the filter element 28 generates lateral forces on the filter element 28 which urge the pleats 34 to bunch, gang or collapse. However, because the first and second sheets 40, 44 are relatively inelastic as compared to the lateral forces and adhesively affixed to essentially the entire edges 37,39 of their respective pleat tips pleat tips 36, 38, and because the first sheet 40 is tautly tensioned across the outer pleat tips 38, the first and second sheets 40, 44 resist and balance the lateral forces generated by the non-uniform fluid flow thereby maintaining pleat 34 spacing and preventing bunching, ganging and collapsing of the pleats 34.

Once the fluid passes through the filter element 28, it next passes through the second sheet 44 preferably without experiencing any measurable pressure drop. Similar to the first sheet 40, the second sheet 44 preferably provides essentially no filtering effect on the fluid and therefore does not experience any appreciable contaminant loading. As a final step in the filtering process, the filtered fluid exits the cylindrical filter 20 through the circular hole 25 in the second end cap 24.

It will be appreciated that the cylindrical filter 20 works well as a liquid filter or an air filter. The cylindrical filter 20 has been tested in oil to a pressure drop across the filter element 28 of 150 psi without experiencing the usual pleat bunching which occurs at minimal pressure drops in conventional fluid filters not having pleat tip retaining means.

It will be apparent to those skilled in the art that various modifications and variations can be made in the use and construction of the present invention without departing from the scope or spirit of the invention. In this regard, it will be appreciated that the cylindrical filter 20 is merely an example of a cylindrical filter utilizing the pleat tip retention means of this invention for maintaining the spacing of the pleat tips. A variety of cylindrical filter designs presently exist and the particular embodiment of this invention illustrated by the cylindrical filter 20 is not to be construed as being a limitation upon the invention.

As an example of a typical modification, a urethane potting compound may be used instead of metal end caps 22, 24 to secure the ends 30, 32 of the filter 20. Furthermore, certain embodiments of the present invention may employ only the first sheet 40 to maintain the pleat 34 spacing of the filter element 28. For many applications, the first sheet 40 surrounding the outermost boundary of the filter element 28 and situated on the upside stream of the flow will provide sufficient support to the outer pleat tips 36 to prevent movement of the pleats 34 and to maintain adequate spacing of the pleats 34.

Figure 4A:
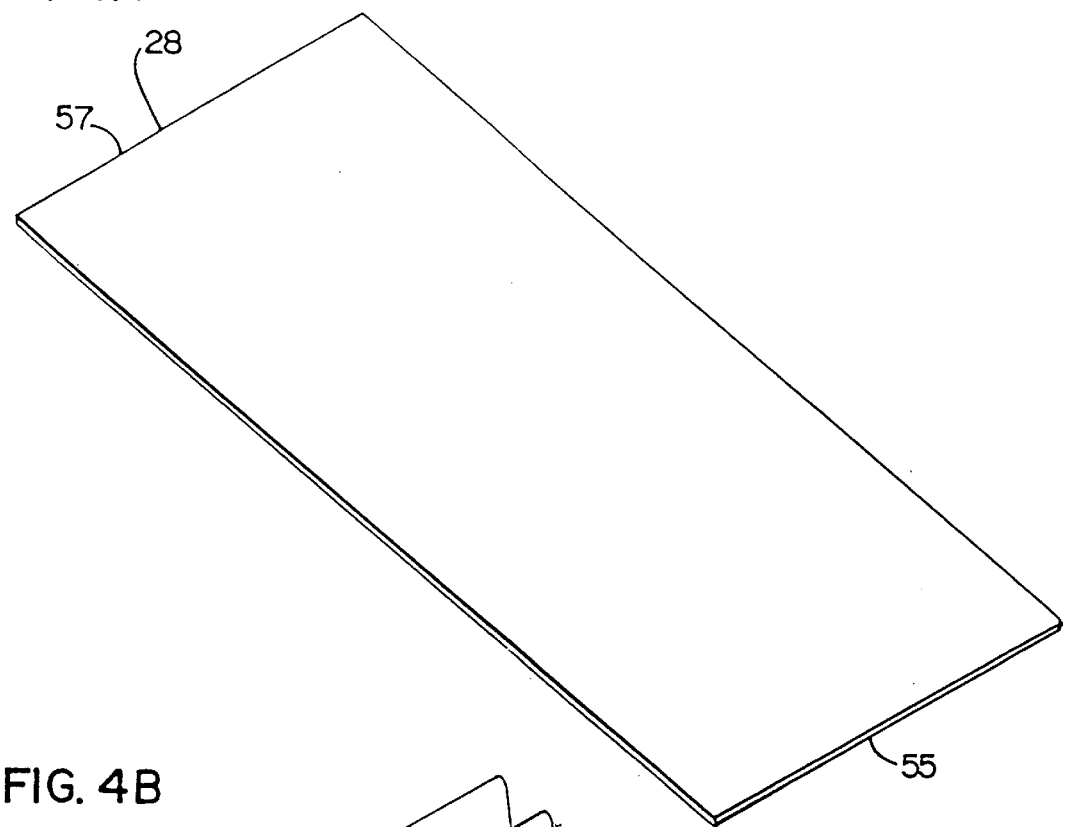
FIGS. 4A–4E illustrate a method for making the cylindrical pleated filter which is embodied in FIG. 1.

Referring to FIGS. 4A–4E, the cylindrical filter 20 is illustrated as it would appear at various stages of the manufacturing process. At the first step of the manufacturing process, the filter element 28 of the cylindrical filter 20 comprises a generally flat piece of filter paper as shown in FIG. 4A which is generally uncoiled from a roll.

Figure 4B:
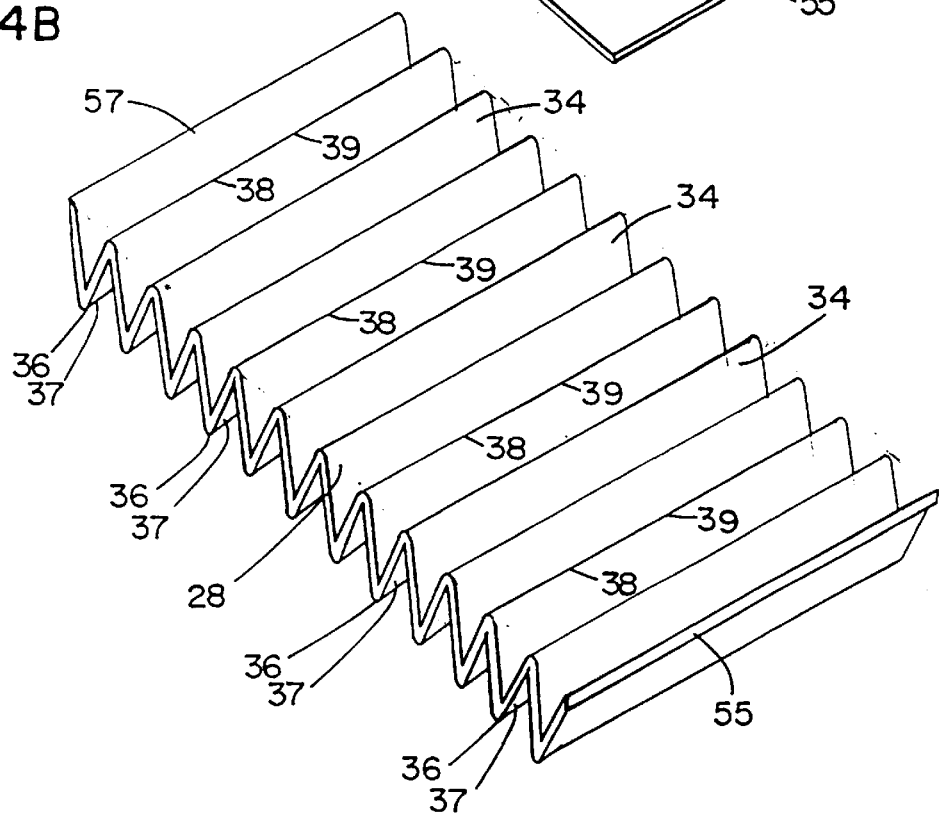

The second step in the manufacturing process is to form the pleats 34 of the filter element 28 by folding the filter element 28 through conventional folding techniques as shown in FIG. 4B. As folded, the successive inner pleat tips 38 define a generally planar first boundary of the filter element 28 and the successive outer pleat tips 36 define a generally planar second boundary of the filter element 28. The first boundary of the filter element 28 opposes and is generally parallel to the second boundary of the filter element 28. The folded filter element 28 also has a first end portion 55 and a second end portion 57.

Figure 4C:
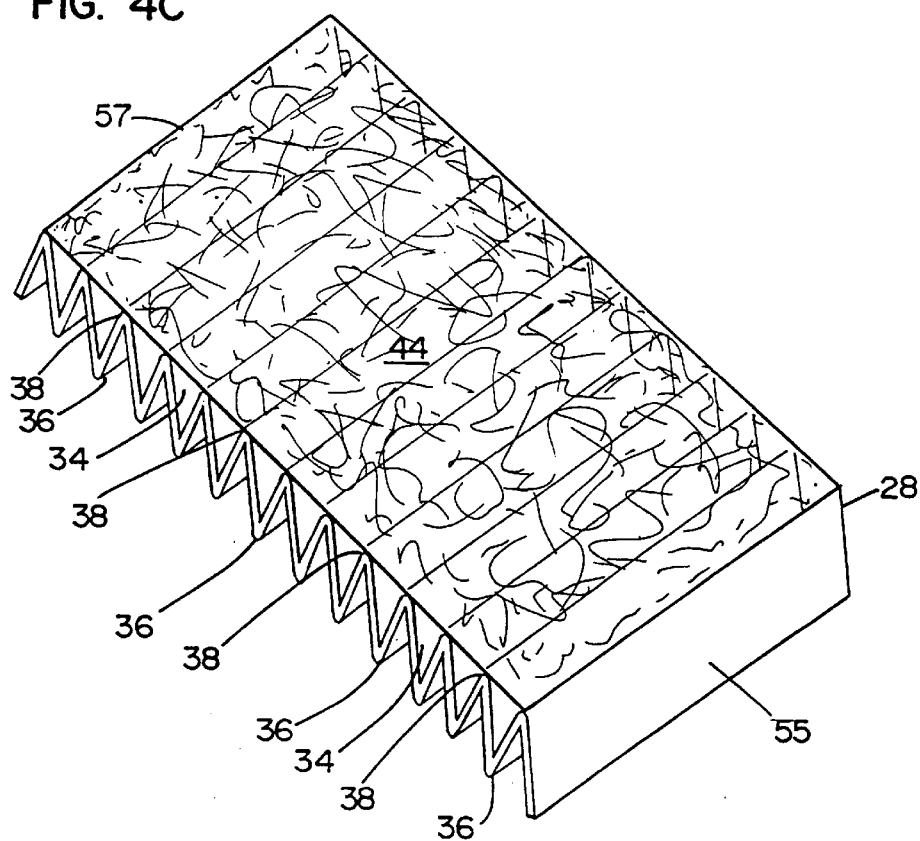

The third step in the manufacturing process relates to the application of the second sheet 44 to the inner pleat tips 38 of the filter element 28. In this regard, the pleats 34 of the filter element 28 are bunched or reefed together and the second sheet 44 is affixed to the inner pleat tips 38 while the filter element 28 is in the flat as shown in FIG. 4C. As affixed, the second sheet 44 has dimensions corresponding to the dimensions of the cylindrical inner boundary defined by the inner pleat tips 38 of the filter element 28 when the filter element 28 is incorporated within the cylindrical filter 20.

It is preferred that the second sheet 44 be affixed to the inner pleat tips 38 by placing a sheet of heat sensitive adhesive, such as a non-woven web hot melt adhesive manufactured by Bostik Corporation, between the inner pleat tips 38 and the second sheet 44 and applying heat to the second sheet 44 to activate the sheet of heat sensitive adhesive. When the sheet of heat sensitive adhesive is heated, it melts into the inner pleat tips 38 and the second sheet 44 effectively bonding the second sheet 44 to the inner pleat tips 38 upon hardening. It will be appreciated that the second sheet 44 may also be bonded to the inner pleat tips 38 by alternative affixing techniques such as spray adhesives or heat fusion.

Figure 4D:
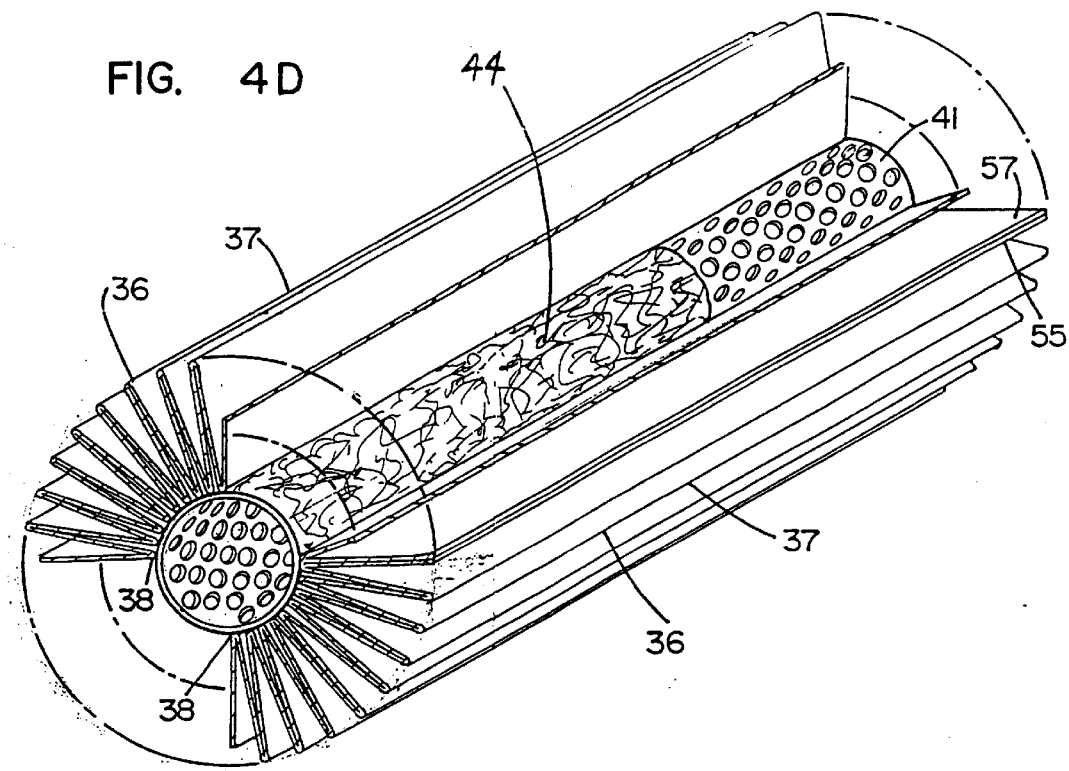

The fourth step in the manufacturing process relates to rolling up the filter element 28, typically around the structural inner liner 41 of the filter 20, such that the inner pleat tips 38 define the generally cylindrical inner boundary which is covered by the second sheet 44 and the outer pleat tips 36 define the generally cylindrical outer boundary. It has been determined by the inventors that because the second sheet 44 is affixed to the inner pleat tips 38, the filter element 28 has sufficient containment to be easily handled and rolled up into the cylindrical shape. While the filter element 28 is supported on the structural inner liner 41, the filter element 28 is rolled up into the cylindrical shape and the first and second end portions 55, 57 of the filter element 28 are permanently affixed to each other as shown in FIG. 4D.

Figure 4E:
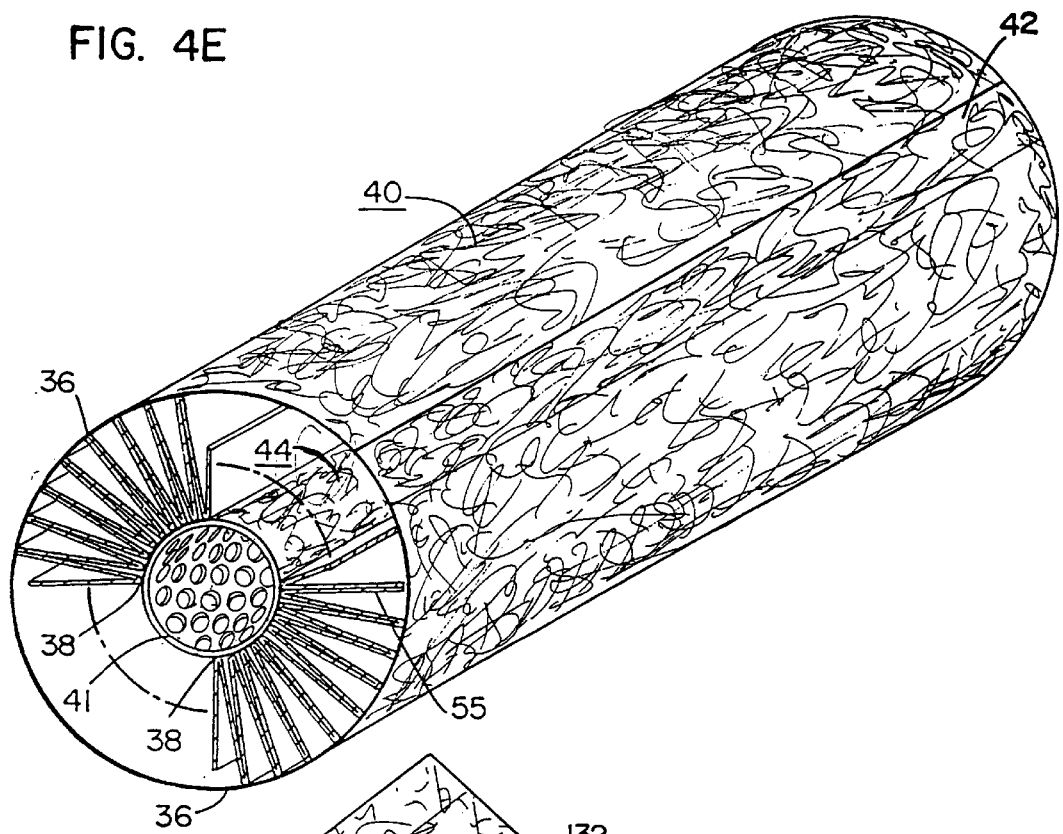

The fifth step in the manufacturing process of the cylindrical filter 20 involves applying the first sheet 40 to the outer cylindrical boundary of the filter element 28 as shown in FIG. 4E. It is preferred that the first sheet 40 be affixed to the outer pleat tips 36 by wrapping a sheet of heat sensitive adhesive, such as non-woven web hot melt adhesive, around the entire outer cylindrical boundary of the filter element 28. The first sheet 40 is wrapped around the entire outer cylindrical boundary of the filter element 28 such that the sheet of heat sensitive adhesive is positioned between the first sheet 40 and the outer pleat tips 36.

When the first sheet 40 is wrapped about the filter element 28, the end portions of the first sheet 40 overlap each other and are bonded to each other by conventional affixing techniques such as adhesives or hot melting to create the longitudinal seam 42. In the alternative, the end portions of the first sheet 40 may be flush and the longitudinal seam 42 may be secured by a strip of material affixed over the end portions or a layer of resin covering the end portions.

Once the first sheet 40 is seamed, heat is applied to the first sheet 40. The heat causes the first sheet 40 to shrink-fit tightly against the outer pleat tips 36 and concurrently activates the sheet of heat sensitive adhesive causing the adhesive to melt into the outer pleat tips 36 and the first sheet 40 effectively bonding the first sheet 40 to the entire edges 37 of the outer pleat tips 36. It will be appreciated that other adhesives such as spray adhesives may also be used to bond the first sheet 40 to the outer pleat tips 36. It will also be appreciated that the first sheet 40 may be post-tensioned by other means such as forcibly inserting within the center of the filter element 28 an inner liner having an outer diameter slightly larger than the inner diameter of the filter element 28.

The final step in manufacturing the cylindrical filter 20 involves affixing the first and second end caps 22, 24 to the filter element 28. In this regard, potting compound is preferably applied to the first and second end caps 22, 24. The first and second end caps 22, 24 are then adhesively bonded by the potting compound to the first and second ends 30, 32 of the filter element 28 as shown in FIG. 1.

It will be apparent to those skilled in the art that the present invention also includes modified methods for manufacturing cylindrical filters in which the sequence of the steps may be altered or certain steps eliminated from the process. For example, in may be desired to eliminate the above-described third step from the manufacturing process in order to manufacture a cylindrical filter which does not include the second sheet 44 covering the generally cylindrical interior boundary of the filter element 28. Additionally, it may be desireable for the first sheet 40 to be affixed to the outer pleat tips 36 of the filter element 28 while the filter element 28 is in the flat and defines the generally planar second boundary. The filter element 28 may then be rolled up in the shape of a cylinder with the first and second end portions 55, 57 of the filter element 28 permanently affixed together such that the first sheet 40 is wrapped around the generally cylindrical outer boundary of the filter element 28. The end portions of the first sheet 40 would preferably be reinforced by resin or a strip of material to secure the longitudinal seam 42. This modified process would preferably be used to manufacture a cylindrical filter including only the first sheet 40 for maintaining pleat 34 spacing.

It will also be appreciated that for some uses, the structural inner liner 41 may be eliminated form the filter 20.

Figure 5:
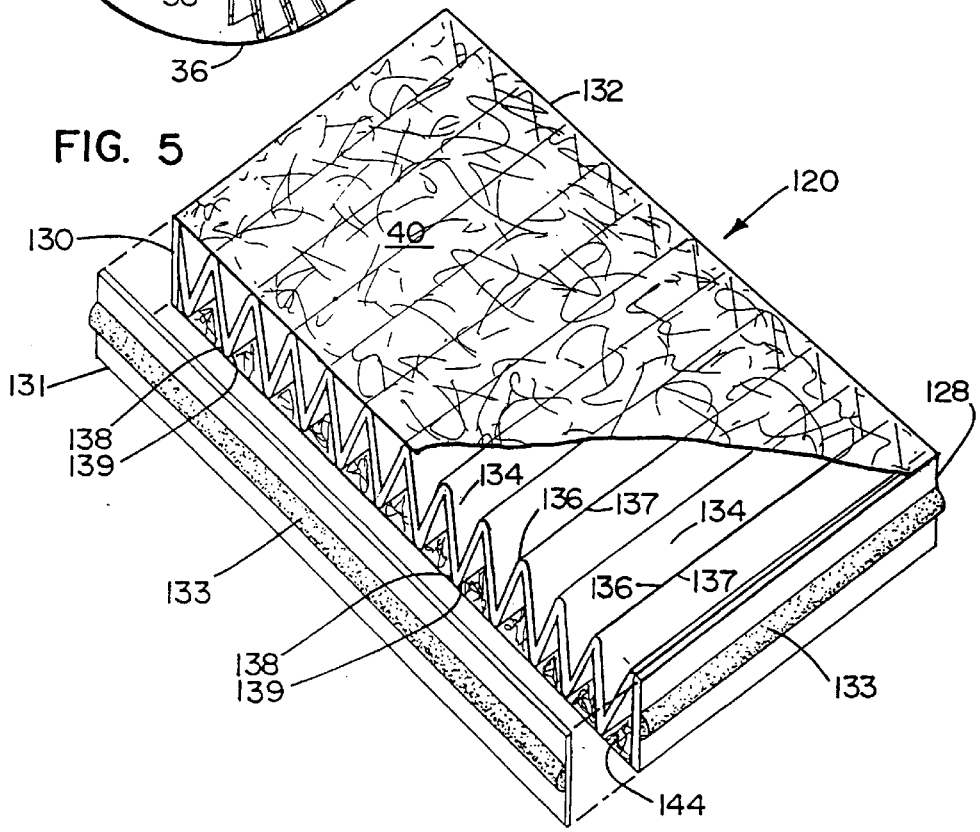
FIG. 5 is a perspective view of a flat pleated filter which is an embodiment of the present invention.

Referring now to FIG. 5, there is illustrated an alternate filter 120 in accordance with the present invention. The filter 120 includes a filter element 128 preferably made of conventional filter paper. The filter element 128 is folded to form a succession of interconnected pleats 134. The pleats 134 include successive inlet pleat tips 136 having first outermost edges 137 which define a generally planar inlet boundary of the filter element 128. Similarly, the pleats also include successive outlet pleat tips 138 having second outermost edges 139 which define a generally planar outlet boundary of the filter element 128.

The filter 120 also includes a first sheet 140 comprising a liner which covers the entire inlet boundary of the filter element 128. The first sheet 140 extends across and is adhesively bonded to the inlet pleat tips 136 of the filter element 128. Similarly, the filter 120 further includes a second sheet 144 comprising a liner which covers the entire outlet boundary of the filter element 128. The second sheet 144 extends across and is adhesively bonded to the outlet pleat tips 138 of the filter element 128.

It will be appreciated that the first and second sheets 140, 144 are made of the same material described previously with respect to the first and second sheets 40, 44 of the cylindrical filter 20. Additionally, it is preferred for the first and second sheets 140, 144 to be affixed to the entire lengths of their respective pleat tips 136, 138 by heat sensitive adhesive. However, it will be appreciated that any conventional adhesive may be employed.

Because the first and second sheets 140, 144 are preferably affixed to the entire lengths of their respective pleat tips 136, 138, the first and second sheets 140, 144 prevent the pleats 134 from moving and increase the rigidity of the filter 120. The rigidity of the filter 120 is further increased by adhesively affixing rectangular end caps 131 made of cardboard or a like material to first and second ends 130, 132 of the filter element 128. It will be appreciated that the first and second ends 130, 132 may also be capped by alternate materials such as resin or potting compound, either of which may provide a surface to attach gasketing 133 around the filter 120.

Due to the rigidity provided to the filter 120 by the first and second sheets 140, 144, it will be appreciated that for many uses the filter 120 does not require an exterior frame as is conventionally used by existing filters. Additionally, it will also be appreciated that the filter 120 may be manufactured in large scale by affixing large sheets to large pleated filter elements and then cutting the large filter element into filters having the desired dimensions. This type of manufacturing process is ideally suited for automation. It will also be appreciated for certain uses, a filter may be constructed having only one sheet for maintaining pleat spacing. For this type of filter, it is desireable to have a sheet covering the inlet boundary of the filter for maintaining pleat spacing.

With regard to the foregoing description, it is to be understood that changes may be made in detail, especially in matters of shape, size and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. A filter comprising:
   a filter element having a succession of interconnected pleats, the pleats including successive spaced pleat tips having outer edges which define a generally cylindrical boundary of the filter element; and
   a highly permeable generally inelastic sheet encircling the filter element and covering substantially the entire generally cylindrical boundary of the filter element, the sheet being wrapped about the filter element and shrink-fitted against the pleat tips of the filter element by application of heat to the sheet such that substantially the entire sheet is uniformly tensioned, wherein the sheet applies uniform centripetal stress to substantially the entire outer edge of each pleat tip for maintaining pleat spacing in the filter element, and wherein the sheet is adhesively affixed to the pleat tips and comprises a plurality of randomly arranged plastic filaments which are bonded to each other at junctions between the filaments and define a plurality of randomly spaced and shaped openings for allowing substantially unrestricted flow of a fluid through the sheet.

2. The filter of claim 1, wherein the sheet has a Frazier air permeability greater than 500.

3. The filter of claim 1, wherein each of the pleat tips defines an edge and the sheet is adhesively affixed to essentially the entire edge of each pleat tip.

4. The filter of claim 1, wherein the sheet is affixed to the pleat tips by heat sensitive adhesive.

5. The filter of claim 1, wherein the sheet has a thickness less than 0.009 inch.

6. A filter comprising:
a filter element having a succession of interconnected pleats, the pleats including successive pleat tips having outer edges extending longitudinally between first and second ends of the filter element, the edges being arranged to define a generally cylindrical boundary of the filter element; and
a single highly permeable generally inelastic sheet encircling the filter element and covering substantially the entire generally cylindrical boundary of the filter element, the sheet being arranged in substantially a single wrap about the filter element and having end portions that overlap one another to form a seam extending between the first and second ends of the filter element, the sheet being adhesively affixed to the pleat tips for maintaining spacing of the pleats, and wherein the sheet comprises a plurality of randomly arranged plastic filaments which are bonded to each other at junctions between the filaments and define a plurality of randomly spaced and shaped openings for allowing substantially unrestricted flow of a fluid through the sheet.

7. The filter of claim 6, wherein the sheet has a Frazier air permeability greater than 500.

8. A filter comprising:
a filter element having a succession of interconnected pleats, the pleats having successive outer pleat tips and successive inner pleat tips, the outer pleat tips defining a generally cylindrical outer boundary of the filter element and the inner pleat tips defining a generally cylindrical inner boundary of the filter element;
a permeable generally inelastic first sheet tightly covering the outer boundary of the filter element, the first sheet being wrapped about the filter element and tensioned against the outer pleat tips of the filter element, the first sheet extending across successive outer pleat tips and being adhesively affixed to the outer pleat tips for maintaining spacing of the pleats;
a permeable generally inelastic second sheet covering the inner boundary of the filter element, the second sheet extending across successive inner pleat tips and being adhesively affixed to the inner pleat tips for maintaining spacing of the pleats; and
wherein each of the first and second sheets comprises a plurality of randomly arranged plastic filaments which are bonded to each other at junctions between the filaments and define a plurality of randomly spaced and shaped openings for allowing substantially unrestricted flow of a fluid through the first and second sheets.

9. A filter comprising:
a filter element having a succession of interconnected pleats, the pleats having successive inlet pleat tips and successive outlet pleat tips, the inlet pleat tips defining a generally planar inlet boundary of the filter element and the outlet pleat tips defining a generally planar outlet boundary of the filter element;
a permeable generally inelastic first sheet covering the inlet boundary of the filter element, the first sheet extending across successive inlet pleat tips and being adhesively affixed to the inlet pleat tips for maintaining spacing of the pleats;
a permeable generally inelastic second sheet covering the outlet boundary of the filter element, the second sheet extending across successive outlet pleat tips and being adhesively affixed to the outlet pleat tips for maintaining spacing of the pleats; and
wherein each of the first and second sheets comprises a plurality of randomly arranged plastic filaments which are bonded to each other at junctions between the filaments and define a plurality of randomly spaced and shaped openings for allowing substantially unrestricted flow of a fluid through the first and second sheets, and each of the sheets has a Frazier air permeability greater than 500.

10. The filter of claim 8, wherein each of the pleat tips defines an edge and the sheet is adhesively affixed to essentially the entire edge of each pleat tip.

11. The filter of claim 8, wherein the sheet is affixed to the pleat tips by heat sensitive adhesive.

12. The filter of claim 8, wherein the sheet has a thickness less than 0.009 inch.

13. A filter comprising:
a filter element having a succession of interconnected pleats, the pleats including successive spaced pleat tips which define a generally cylindrical boundary of the filter element; and
a permeable fibrous first sheet extending around the cylindrical boundary of the filter element for maintaining spacing of the pleats, the first sheet including a plurality of heat shrunk fibers constructed of a plastic material, the plastic fibers being heat shrunk after the first sheet has been placed around the filter element such that the first sheet is tightened about the filter element.

14. The filter of claim 13, wherein the fibrous first sheet is wrapped in substantially a single turn about the filter element and covers substantially the entire generally cylindrical outer boundary of the filter element.

15. The filter of claim 13, wherein the first sheet has end portions that overlap one another to form a seam that extends longitudinally along the filter element.

16. The filter of claim 13, wherein the plastic fibers are randomly arranged and bonded to each other at junctions between the fibers.

17. The filter of claim 13, wherein the first sheet has a Frazier air permeability greater than 500.

18. The filter of claim 13, wherein each of the pleat tips defines an edge extending lengthwise along the filter element, and the first sheet is adhesively affixed to essentially the entire edge of each pleat tip.

19. The filter of claim 13, wherein the first sheet has a thickness less than 0.009 inch.

20. A filter comprising:
a filter element having a succession of interconnected pleats, the pleats including successive spaced pleat tips which define a generally cylindrical boundary of the filter element; and
a permeable fibrous first sheet extending around the cylindrical boundary of the filter element for maintaining spacing of the pleats, the first sheet including a matte of plastic fibers, the first sheet being arranged to cover substantially the entire generally cylindrical boundary of the filter element, and wherein the first sheet comprises a plurality of randomly arranged plastic filaments which are bonded to each other at junctions between the filaments and define a plurality of randomly spaced and shaped openings for allowing substantially unrestricted flow of a fluid through the first sheet.

21. The filter of claim 20, wherein the first sheet has a Frazier air permeability greater than 500.

22. The filter of claim 20, wherein the first sheet has a thickness less than 0.009 inch.

23. A filter comprising:

a filter element having a succession of interconnected pleats, the pleats including successive spaced pleat tips which define a generally cylindrical boundary of the filter element; and a permeable fibrous first sheet extending around the cylindrical boundary of the filter element for maintaining spacing of the pleats, the first sheet including a plurality of randomly arranged plastic fibers, and the first sheet having a thickness less than 0.009 inch and a Frazier air permeability greater than 500, and wherein the first sheet comprises a plurality of randomly arranged plastic filaments which are bonded to each other at junctions between the filaments and define a plurality of randomly spaced and shaped openings for allowing substantially unrestricted flow of a fluid through the first sheet.

\* \* \* \* \*